UNITED STATES PATENT OFFICE.

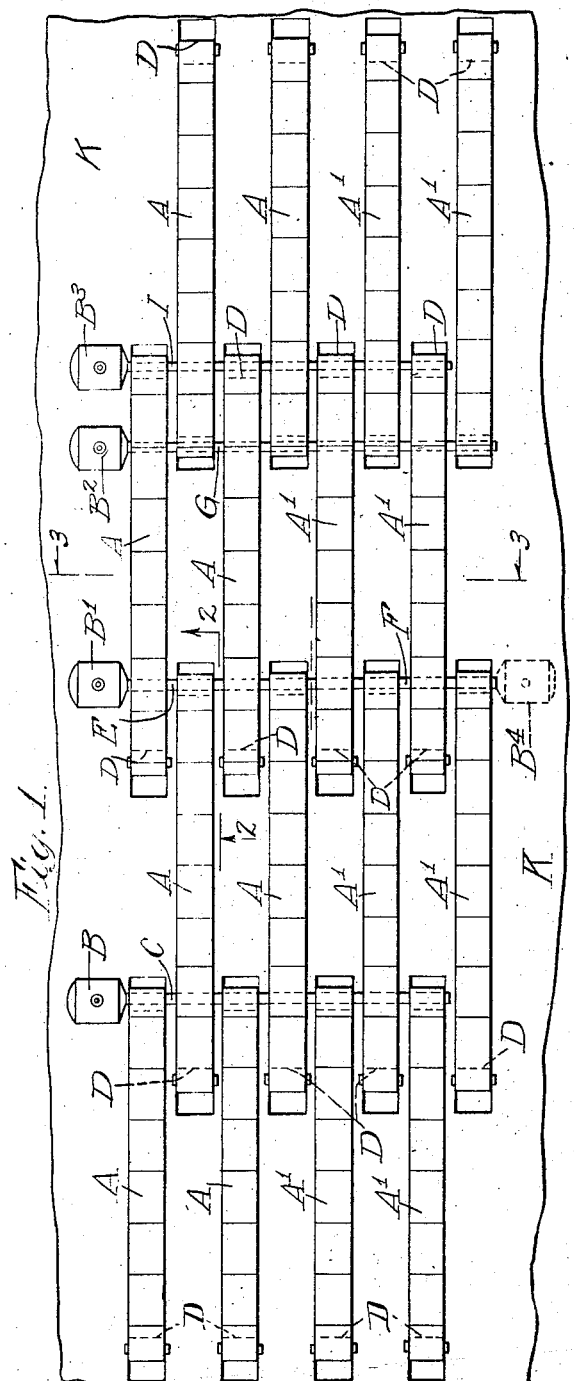
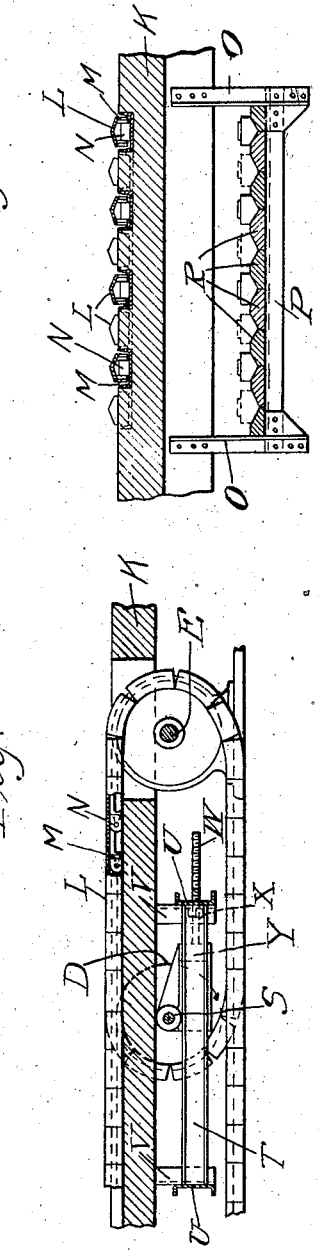

STAUNTON B. PECK, OF PHILADELPHIA, PENNSYLVANIA, ASSIGNOR TO LINK-BELT COMPANY, OF CHICAGO, ILLINOIS, A CORPORATION OF ILLINOIS.

CONVEYER SYSTEM.

1,199,818.  Specification of Letters Patent.  Patented Oct. 3, 1916.

Application filed January 16, 1915. Serial No. 2,521.

*To all whom it may concern:*

Be it known that I, STAUNTON B. PECK, a citizen of the United States, residing at Philadelphia, in the county of Philadelphia and State of Pennsylvania, have invented a certain new and useful Improvement in Conveyer Systems, of which the following is a specification.

My invention relates to a conveyer system adapted for use in warehouses or factories where large units are to be conveyed and where it may be desirable for sections of the conveyers to be simultaneously operating in opposite directions.

It is illustrated in the accompanying drawings, wherein—

Figure 1 is a diagrammatic plan view of a portion of the conveyer contained in my invention; Fig. 2 is a cross section on the line 2—2 of Fig. 1; Fig. 3 is a cross section on the line 3—3 of Fig. 1.

Like parts are indicated by the same letters in all the figures.

A, A and $A^1$, $A^1$ are conveyer belts arranged in longitudinal groups overlapping ends and also arranged if desired in groups side by side driven by separate driving means.

B, $B^1$, $B^2$, $B^3$ and $B^4$ are diagrammatic ilustrations of variable speed and reversible motors of any kind or description. The motor B drives the shaft C which is provided with a series of sprocket wheels whereby the conveyer belts A and $A^1$ are driven in either direction and at variable speeds.

D, D are a series of idler sprocket wheels over which the belts A, $A^1$ travel.

The motor $B^1$ drives the shaft E and the motor $B^4$ the shaft F, the two together constituting motors $B^2$ and $B^3$ are adapted to drive respectively shafts G and I which are supplied with sprocket wheels to drive the appropriate belts A and $A^1$, said belts in turn traveling over the idlers D.

The object of the arrangement of the parts shown in Fig. 1 in the diagrammatic manner is to illustrate that there may be at each point where the successive belts overlap one motor and one shaft to drive one set of belts extending in one direction and the idler sprockets to carry the ends of the set of belts coming from the other direction; or to illustrate that the two driving shafts may be placed together with the belts extending in opposite directions therefrom; or that the driving shaft may be divided into two sections so that either set of two belts may be driven in either direction by either motor.

K is the floor presumably of concrete provided with a series of troughs or slots in which the conveyer belts travel. Each conveyer belt is preferably composed of a series of upper sections L preferably roof-shaped and with downwardly projecting lugs M between which is mounted the roller N which travels in the slot or groove. Since Fig. 3 is taken on the line 3—3, each alternate belt is shown in section and the intermediate belts in elevation. Downwardly depending from the floor are the hangers O, O with the supporting or cross-piece P on which is mounted a series of wooden strips R, R furnishing grooves in which the inverted conveyer belts travel. The idler sprocket wheel D is mounted on a tension device consisting of the bearing S movably mounted on a rod T supported between the I-beams U, U which are in turn carried by the hangers V, V from the floor K.

W is a screw-threaded rod with a nut X which when turned causes the rod to travel. The rod is provided with a head Y which bears against the bearing S so that the idler sprocket wheel may be moved to take up the slack in the conveyer belt.

These several parts I have shown more or less in detail and more or less diagrammatically without intending to limit myself to any particular form or arrangement, as great variations in respect to size, proportions, arrangements and numbers of the several parts can be made without departing from the spirit of my invention.

The use and operation of my invention are as follows: Assuming the warehouse floor extended with a line of machines, or a line of discharge or receiving stations therealong, it obviously becomes important to have means whereby the material to be carried can be placed upon a conveyer at any point along the line and be delivered at any other point along the line in either direction. It is equally desirable that there should be means whereby the conveyer may be in whole, or in part, operated at the same time and whereby portions of it may be operated in opposite directions. In any such conveyer it is highly important that objects of the nature proposed to be conveyed by such conveyer should be, without any break in their travel, or with the least possible or perceptible break, passed from one section to another; for any such conveyer there must be, of course, a series of coöperating sections. By setting the several motors to operate in a predetermined manner it will be possible to load material on the conveyer near either end and convey it any desired distance, or to the extreme farther end, or similarly, in the reverse direction. It is equally apparent that materials may be simultaneously loaded upon the conveyer at both ends and conveyed to the middle, or at predetermined points between the ends and the middle, where they will be removed by attendants or, in like manner, materials may be loaded upon the conveyer at the middle, or any point between the ends, and conveyed in opposite directions toward the ends. In short, while one section of the conveyer is being employed to transport material in one direction from one point to another some other section of the conveyer may be similarly employed to transport material in the same or opposite direction between other points.

I have also shown diagrammatically an arrangement whereby one or more sections of the belt may travel in a direction opposite to that of the adjacent parallel sections. When the material under transport is brought to a given point where it is to be discharged it may be delivered from the traveling conveyer belt onto the adjacent idler conveyer belts, or if being brought from both directions to the point of discharge, then it will be arrested in its motion at the point where the two conveyer belts overlap, but in no case will there be any danger of interference with the action by any break between the belts.

By the term "floor" I mean to refer to the general level in which the working portions of the conveyers travel, and of course such floor or level could be arranged at any desired point at any desired level with reference to the floor proper of the building. In practice, probably the floor of the building and the floor as I am using that expression would be one and the same. The term "floor" therefore indicates the working level in substantial parallelism with which the working portions of the conveyers operate. By the expression "roof-shaped" as applied to sections of the conveyer belt, I mean to indicate such a formation of the upper or working side of the conveyer belt as will cover the co-acting parts of such belt or the working parts. The object is to make it possible for the workmen to pass back and forth over the conveyer belts from one to another from side to side with trucks or otherwise, and to move or shift bags or packages of flexible material or with loose parts depending therefrom, without danger from interference with or by such operating or engaging parts of the conveyer belt. Of course, such a form of chain is not absolutely indispensable, nor is it absolutely indispensable that the working conveyers should be arranged on or level with an extended working floor. If for any reason the set of conveyers were to be elevated above the floor or separated from any extended working level, then at least the chains might perhaps be profitably uncovered or formed without such roofing.

I claim:

1. A conveyer comprising successive groups of overlapping parallel conveyer sections and means for independently driving each group.

2. A conveyer comprising successive groups of overlapping parallel conveyer sections and means for independently driving each group in either direction.

3. A conveyer comprising successive groups of overlapping parallel conveyer sections and means for independently driving each group at varying speeds.

4. A conveyer comprising successive groups of overlapping parallel conveyer sections and means for independently driving each group in either direction at varying speeds.

5. A conveyer comprising successive groups of overlapping parallel conveyer sections, said sections comprising chain belts in combination with floor slots in which they run, and means for independently driving each group.

6. A conveyer comprising successive groups of overlapping parallel conveyer sections, said sections comprising chain belts in combination with floor slots in which they run, and means for independently driving each group in either direction.

7. A conveyer comprising successive groups of overlapping parallel conveyer sections, said sections comprising chain belts in combination with floor slots in which they run, and means for independently driving each group at varying speeds.

8. A conveyer comprising successive groups of overlapping parallel conveyer sections, said sections comprising chain belts in combination with floor slots in which they run, and means for independently driving each group in either direction at varying speeds.

9. A conveyer comprising successive groups of overlapping parallel conveyer sections sunk to a level slightly below the working level of such conveyer sections and means for independently driving each group.

10. A conveyer comprising groups of conveyer sections arranged so as to form an effectively continuous conveying surface and means for independently driving each group, said conveyer sections sunk to a level slightly below the working level of such conveyer sections in combination with return and driving mechanism placed below the floor.

11. A conveyer comprising successive groups of conveyer sections arranged to form a continuous conveying surface and means for independently driving each group, said conveyer sections sunk to a level slightly below the working level of such conveyer sections in combination with return and driving mechanism placed below the floor.

12. A conveyer comprising successive separate conveyers arranged to present a continuous conveying surface and means for independently driving such separate conveyers, said conveyer sections sunk to a level slightly below the working level of such conveyer sections in combination with return and driving mechanism placed below the floor.

13. A conveyer comprising successive groups of overlapping parallel conveyer sections, said sections comprising chain belts in combination with slots for said chain belts sunk beneath the working level in which they run, and means for independently driving each group.

14. A conveyer comprising successive groups of overlapping parallel conveyer sections, said sections comprising chain belts in combination with slots for said chain belts sunk beneath the working level in which they run, and means for independently driving each group in either direction.

15. A conveyer comprising successive groups of overlapping parallel conveyer sections, said sections comprising chain belts in combination with slots for said chain belts sunk beneath the working level in which they run, and means for independently driving each group at varying speeds.

16. A conveyer comprising successive groups of overlapping parallel conveyer sections, said sections comprising chain belts in combination with slots for said chain belts sunk beneath the working level in which they run, and means for independently driving each group in either direction at varying speeds.

In testimony whereof, I affix my signature in the presence of two witnesses this 31st day of December, 1914.

STAUNTON B. PECK.

Witnesses:
J. WALTER LAUER,
A. J. OWENS.